United States Patent
Yanashima et al.

(12) 
(10) Patent No.: US 6,737,783 B2
(45) Date of Patent: May 18, 2004

(54) SEALED MOTOR COMPRESSOR

(75) Inventors: Toshihito Yanashima, Gunma-ken (JP); Yoshitomo Nakayama, Gunma-ken (JP); Masaaki Takezawa, Gunma-ken (JP); Shigemi Koiso, Gunma-ken (JP); Kazuhiko Arai, Gunma-ken (JP); Keijiro Igarashi, Gunma-ken (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 93 days.

(21) Appl. No.: 09/812,951

(22) Filed: Mar. 27, 2001

(65) Prior Publication Data

US 2001/0050541 A1 Dec. 13, 2001

(30) Foreign Application Priority Data

Mar. 29, 2000 (JP) .................... 2000-091625
May 30, 2000 (JP) .................... 2000-160302

(51) Int. Cl.[7] .............................. H02K 17/16
(52) U.S. Cl. .............. 310/211; 310/210; 310/179; 310/216
(58) Field of Search ................. 310/211, 210, 310/179, 216, 156.47, 156.78, 156.81

(56) References Cited

U.S. PATENT DOCUMENTS

| | | | | |
|---|---|---|---|---|
| 3,157,809 A | * | 11/1964 | Bekey | 310/156 |
| 4,139,790 A | * | 2/1979 | Steen | 310/156 |
| 4,387,330 A | * | 6/1983 | Zigler | 318/788 |
| 4,403,161 A | | 9/1983 | Miyashita et al. | |
| 4,564,777 A | | 1/1986 | Senoo et al. | |
| 5,097,166 A | * | 3/1992 | Mikulic | 310/156 |

* cited by examiner

Primary Examiner—Thanh Lam
(74) Attorney, Agent, or Firm—Armstrong, Kratz, Quintos, Hanson & Brooks, LLP

(57) ABSTRACT

A sealed motor compressor in which a motor running efficiency is largely enhanced with a single-phase bipolar constitution, an electromotive element is fixed to a sealed container, and formed of a stator provided with a stator winding, and a rotor which rotates in the stator, and the rotor is formed of a squirrel-cage secondary conductor disposed in a peripheral portion of a rotor yoke, and a permanent magnet is embedded in the rotor yoke.

13 Claims, 14 Drawing Sheets

SEALED MOTOR COMPRESSOR

BACKGROUND OF THE INVENTION

1. Field of the Invention

The present invention relates to a sealed motor compressor containing a compressing element and an electromotive element for driving the compressing element in a sealed container.

2. Description of the Related Art

As a conventional electromotive element for driving a sealed motor compressor forming a freezing cycle of a refrigerator (freezer), or an air conditioner, an induction motor driven by a single-phase commercial power source, DC brushless motor, and the like have been employed. An electromotive element of the motor is fixed in a sealed container, and the electromotive element is formed of a stator comprising a stator winding, and a rotor rotating in the stator. Moreover, the electromotive element supplies a commercial alternating current supply to the stator winding to induce/rotate the rotor.

However, the DC brushless motor requires a drive control equipment, and disadvantageously results in a cost increase. Moreover, because a secondary copper loss is theoretically present in the induction motor, running efficiency is limited. Therefore, there has been a desire for further improvement of the running efficiency of the sealed motor compressor driven by the commercial single phase power source without using any control equipment.

Moreover, there has been a desire for development of the sealed motor compressor in which he electromotive element using a three-phase power source can be driven with a high efficiency without requiring any drive control equipment.

SUMMARY OF THE INVENTION

The present invention has been developed to solve such related art problem, and an object thereof is to provide a sealed motor compressor whose single-phase bipolar construction largely enhances a motor running efficiency.

Another object of the present invention is to provide a sealed motor compressor in which an electromotive element with a three-phase bipolar construction can be driven with a high efficiency without requiring any drive control equipment.

That is to say, according to the present invention, there is provided a sealed motor compressor containing a compressing element and an electromotive element for driving the compressing element in a sealed container. The electromotive element is fixed to the sealed container, and formed of a stator provided with a stator winding and a rotor which rotates in the stator. The rotor comprises a squirrel-cage secondary conductor disposed in a peripheral portion of a rotor yoke, and a permanent magnet embedded in the rotor yoke.

Moreover, for the sealed motor compressor of the present invention, in the above, the electromotive element comprises a single-phase bipolar construction.

Furthermore, for the sealed motor compressor of the present invention, in the above, the electromotive element is started by a system using a startup capacitor.

Additionally, for the sealed motor compressor of the present invention, in addition to the above, the stator winding comprises a main winding and an auxiliary winding, and a winding ratio of the respective windings by effective winding number calculation is set to be in a range of 1.0±0.5.

Moreover, in the sealed motor compressor of the present invention, the squirrel-cage secondary conductor of the rotor comprises a skewed structure.

Furthermore, for the sealed motor compressor of the present invention, the permanent magnet is a rare earth magnet.

Additionally, for the sealed motor compressor of the present invention, the number of permanent magnets embedded in the rotor yoke is any number selected from the group consisting of two, four, six and eight.

Moreover, the sealed motor compressor of the present invention further comprises current-sensitive protection means for detecting a line current.

Furthermore, according to the present invention, there is provided a sealed motor compressor containing a compressing element and an electromotive element for driving the compressing element in a sealed container. The electromotive element is driven by a three-phase power source, fixed to the sealed container, and constituted of a stator provided with a stator winding and a permanent magnet embedded type rotor which rotates in the stator. The rotor comprises a squirrel-cage secondary conductor disposed in a peripheral portion of a rotor yoke, and a permanent magnet embedded in the rotor yoke.

Moreover, for the sealed motor compressor of the present invention, in the above, the electromotive element comprises a three-phase bipolar constitution.

Furthermore, in the sealed motor compressor of the present invention, the squirrel-cage secondary conductor of the rotor comprises a skewed structure, and a skew pitch is more than 0, and is 1.5 slot pitches or less.

Additionally, for the sealed motor compressor of the present invention, the permanent magnet is a rare earth magnet.

Moreover, for the sealed motor compressor of the present invention, the number of permanent magnets embedded in the rotor yoke is an even number.

Furthermore, the sealed motor compressor of the present invention further comprises current-sensitive protection means for detecting a line current.

Additionally, for the sealed motor compressor of the present invention capability control is enabled.

DETAILED DESCRIPTION OF THE PREFERRED EMBODIMENTS

Figure 1:
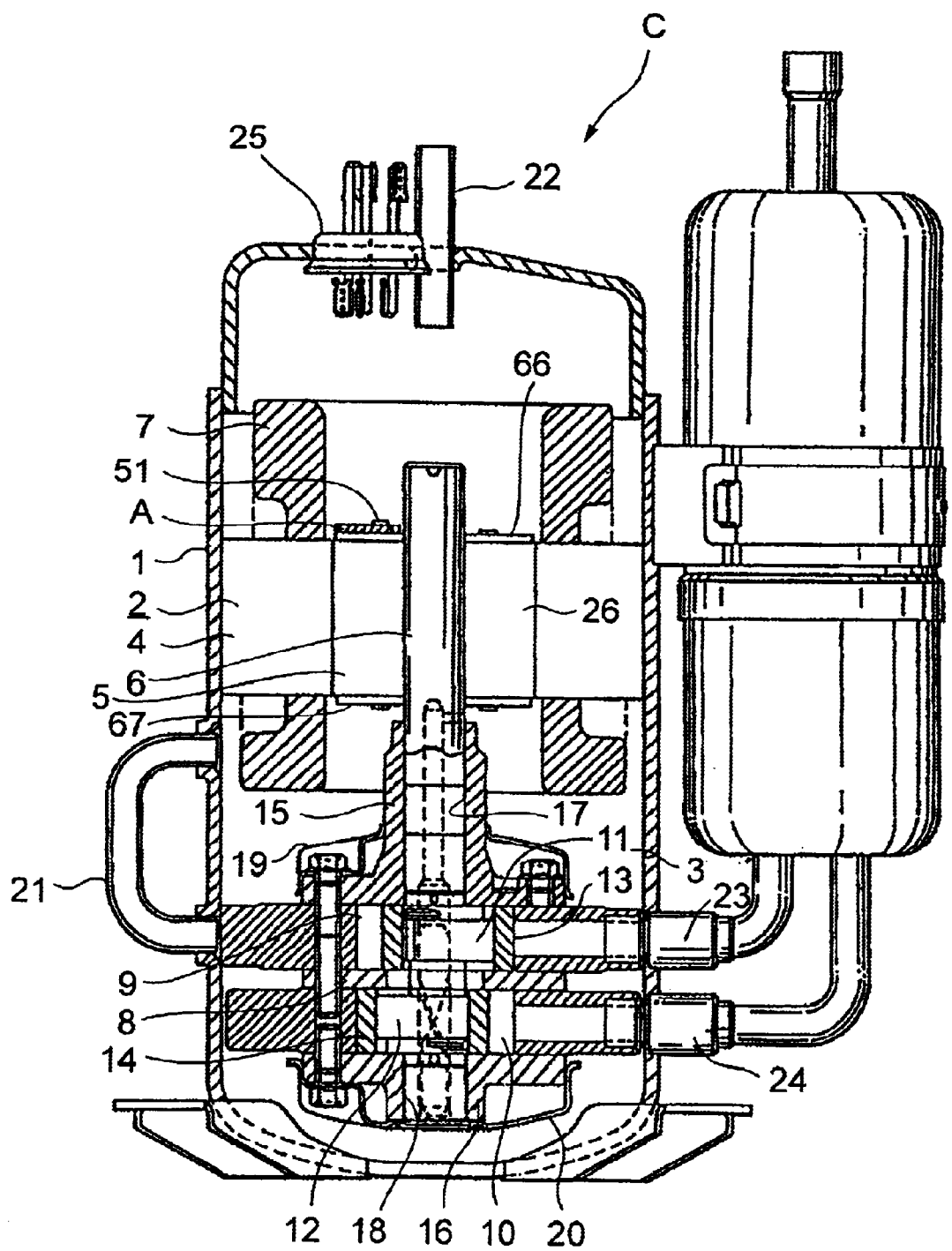
FIG. 1 is a vertical side sectional view of a sealed motor compressor to which the present invention is applied.

An embodiment of the present invention will next be described with reference to the drawings. FIG. 1 is a vertical side sectional view of a sealed motor compressor C to which the present invention is applied. In FIG. 1, in a sealed container 1, a motor (alternating current induction motor) 2 is contained as an electromotive element in an upper part of the container, and a compressing element 3 rotated/driven by the motor 2 is contained in a lower part of the container. The sealed container 1 contains the motor 2 and compressing element 3 beforehand in two pre-divided sections, and hermetically closing the sections by high-frequency welding. Additionally, examples of the sealed motor compressor C include a rotary compressor, reciprocating compressor, and a scroll compressor.

The motor 2 is provided with a single-phase bipolar construction, and includes a stator 4 fixed to an inner wall of the sealed container 1, and a rotor 5 supported inside the stator 4 to be freely rotatable centering on a rotation shaft 6. Moreover, the stator 4 is provided with a stator winding 7 for supplying a rotary magnetic field to the rotor 5.

The compressing element 3 is provided with a first rotary cylinder 9 and second rotary cylinder 10 which are divided from each other by a middle partition plate 8. Eccentric parts 11, 12 rotated/driven by the rotation shaft 6 are attached to the respective cylinders 9, 10, and these eccentric parts 11, 12 deviate from each other in phase by 180 degrees.

Numerals 13, 14 denote first and second rollers rotating in the respective cylinders 9, 10, and the respective rollers rotate in the cylinders by rotation of the eccentric parts 11, 12. Numerals 15, 16 denote first and second frames, the first frame 15 forms a closed compression space of the cylinder 9 together with the middle partition plate 8, and the second frame 16 similarly forms the closed compression space of the cylinder 10 together with the middle partition plate 8. Moreover, the first and second frames 15, 16 are provided with bearings 17, 18 which rotatably support a lower part of the rotation shaft 6.

Discharge mufflers 19, 20 are attached to cover the first and second frame 15, 16, respectively. Additionally, the cylinder 9 and discharge muffler 19 are connected to each other via a discharge hole (not shown) disposed in the first frame 15, and the cylinder 10 and discharge muffler 20 are also connected to each other via a discharge hole (not shown) disposed in the second frame 16. A bypass tube 21 is disposed on an outer part of the sealed container 1, and connected to the inside of the discharge muffler 20.

Moreover, numeral 22 denotes a discharge tube disposed on the top of the sealed container 1, and 23, 24 denote suction tubes connected to the cylinders 9, 10. Moreover, numeral 25 denotes a sealed terminal for supplying power to the stator winding 7 of the stator 4 from the outside of the sealed container 1 (a lead wire for connecting the sealed terminal 25 to the stator winding 7 is not shown).

Moreover, numeral 26 denotes a rotor core in which a plurality of rotor iron plates obtained by stamping 0.3 to 0.7 mm thick electromagnetic steel plates into predetermined shapes (not shown) are laminated and integrally caulked/laminated onto one another (additionally, the plates may integrally be welded to one another without being caulked). Numerals 66, 67 denote flat-plate end surface members attached to upper and lower ends of the rotor iron 26, and the members are molded of nonmagnetic materials such as aluminum and resin materials into substantially the same shapes as those of the rotor iron plates. A balance weight A is fixed to the rotor core 26 via the upper end surface member 66 by a rivet 51.

Figure 2:
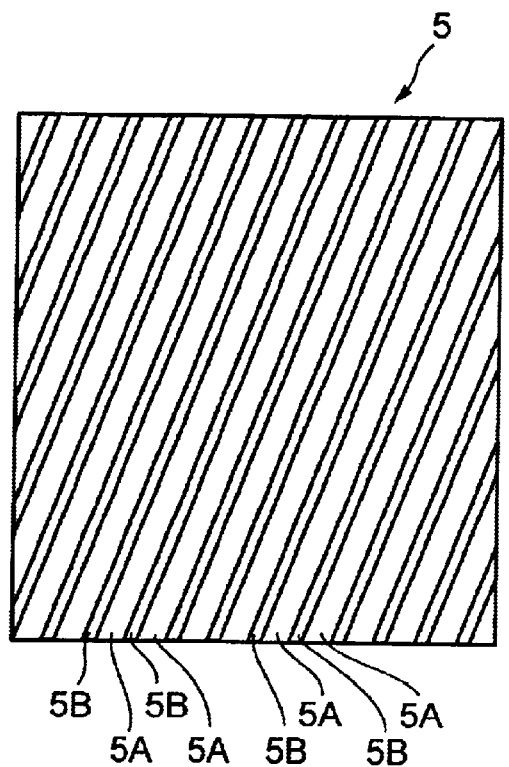
FIG. 2 is a plan view of a rotor of the sealed motor compressor of FIG. 1.
Figure 3:
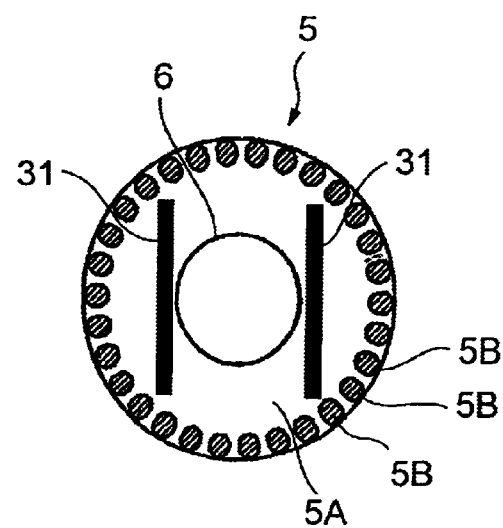
FIG. 3 is a transverse top plan view of the rotor of the present invention.

FIG. 2 is a plan view of the rotor 5 shown in FIG. 1, and FIG. 3 is a transverse top plan view of the rotor 5. The rotor 5 is formed of a rotor yoke 5A, squirrel-cage secondary conductor 5B disposed in a peripheral portion of the rotor yoke 5A, and a permanent magnet 31 embedded in the rotor yoke 5A. A plurality of squirrel-cage secondary conductors 5B are disposed in the peripheral portion of the rotor yoke 5A, and the conductor is injection-molded in a cylindrical hole (not shown) formed in a squirrel-cage shape across an extending direction of the rotation shaft 6 by aluminum die casting. Both ends of the squirrel-cage secondary conductor 5B are formed in a so-called skewed structure such that each end is sloped in a spiral form with a predetermined angle in a circumferential direction of the rotation shaft 6.

Moreover, two permanent magnets 31 are embedded in the rotor yoke 5A. The permanent magnets 31 are formed in plate shapes, disposed opposite and parallel to each other centering on the rotor 5, and embedded from one end to the other end of the rotor yoke 5A. Used in the permanent magnet 31 is a rare earth magnet which has a highest magnetic flux density among permanent magnets. Opposite surfaces of the permanent magnets 31 are embedded with different magnetic poles. That is to say, the respective permanent magnets 31 are embedded toward the outside of the circumferential direction of the rotor 5 with different magnetic poles, and constructed such that a rotating force can be imparted to the rotor 5 with magnetic force lines of a main winding 7A and auxiliary winding 7B described later.

Figure 4:
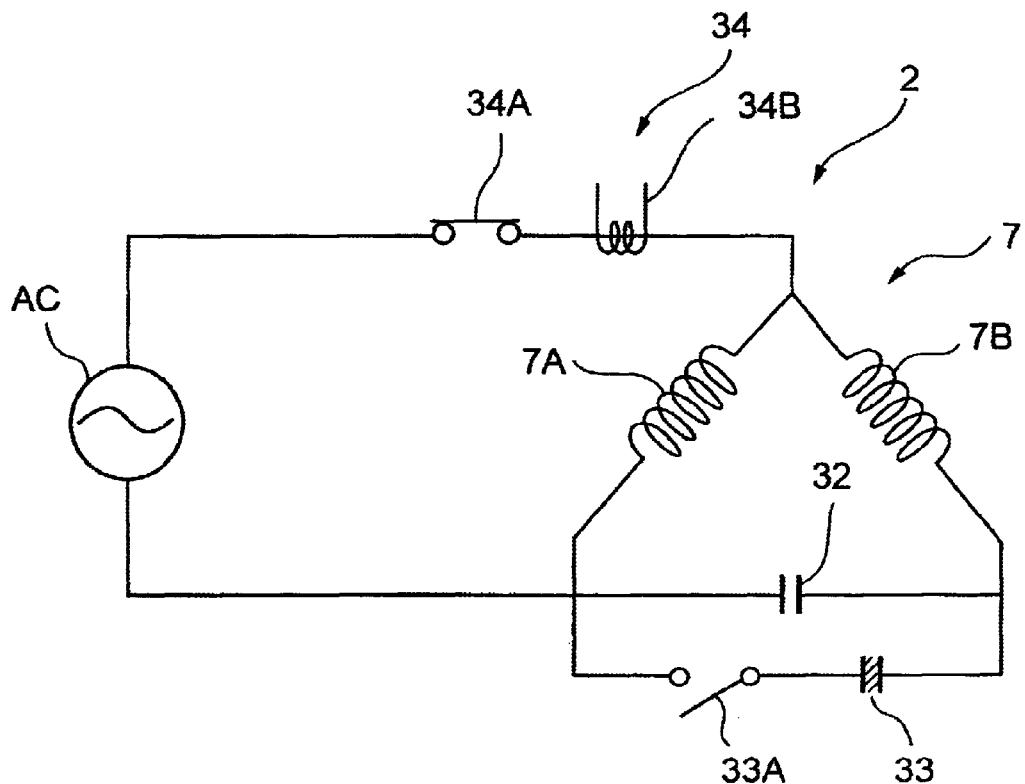
FIG. 4 is an electric circuit diagram of an electromotive element (motor) constituting the sealed motor compressor of the present invention.

On the other hand, in FIG. 4, the motor (electromotive element) 2 is provided with the stator winding 7 comprising the main winding 7A and auxiliary winding 7B. The stator winding 7 is constituted of the main winding 7A and auxiliary winding 7B, and the winding ratio of the main winding 7A to the auxiliary winding 7B by effective winding number calculation is set to 1.0±0.5. Moreover, one end of the auxiliary winding 7B is connected to a running capacitor 32 connected in series, and a serial circuit of a startup capacitor 33 and startup switch 33A connected parallel to the running capacitor 32.

A power supply circuit of the stator winding 7 is provided with current-sensitive protection means 34 for detecting a line current, the protection means 34 is constituted of a line current detector 34B for detecting the line current, and a protection switch 34A, and the protection switch 34A is connected in series with the other end of the main winding 7A. Moreover, when the line current detector 34B senses a predetermined current, the line current detector 34B actuates the protection switch 34A in such a manner that power supply to the stator winding 7 can be cut off. Additionally, the protection switch 34A also serves as a power switch for controlling the power supply to the motor 2. In this case, a power switch (not shown) other than the protection switch 34A may be disposed in series with the protection switch 34A.

Operation of the aforementioned construction will next be described. Additionally, it is assumed that the motor 2 is stopped and the startup switch 33A is closed. Moreover, when the power switch (protection switch 34A) is closed, current starts to flow to the main winding 7A and auxiliary winding 7B. Furthermore, because the auxiliary winding 7B is connected to a parallel circuit of the startup capacitor 33 and running capacitor 32, the rotor 5 obtains a required startup torque and starts in a predetermined rotation direction.

In this case, because the rotor 5 has a squirrel-cage secondary conductor similar to a general induction machine, the rotor 5 responds to the current flowing to the stator winding 7 and the motor 2 is started. Moreover, when the rotor 5 is accelerated to achieve rotation at a predetermined number of revolutions (in this case, about 80% of the number of synchronous revolutions), the startup switch 33A is opened to disconnect the startup capacitor 33 from the circuit, and the motor 2 is operated only by the running capacitor 32. Thereby, during a transient state of the motor 2 from a startup moment at which the power switch closes until the motor enters synchronous running, it is possible to generate a torque larger than a braking torque generated by the permanent magnet 31. Therefore, during self starting, the surpassing large torque is generated and the motor can be started.

Moreover, because the squirrel-cage secondary conductor 5B of the rotor 5 is provided with the skewed structure, similarly as the conventional induction motor, self starting can easily be performed with the single phase power source. Moreover, because the synchronous running can be secured by the permanent magnet 31, secondary copper loss during running can largely be decreased.

On the other hand, during running of the motor 2, the line current detector 34B monitors the current flowing through the stator winding 7, and it is possible to cut off the power supply to the motor 2 when the rotor 5 generates heat. That is, when the rotor 5 generates heat, the protection means 34 cuts off the current flowing through the stator winding 7, and prevents the rotor 5 from further raising its temperature. This can prevent the permanent magnet 31 embedded in the rotor 5 from being demagnetized by heat (demagnetization by temperature). Additionally, because demagnetization by a predetermined temperature added to the permanent magnet 31 is a conventional known technique, detailed description thereof is omitted.

As described above, because in the rotor 5 of the motor 2 provided with the single-phase bipolar constitution, the permanent magnets 31 are embedded in the squirrel-cage secondary conductor 5B disposed in the peripheral portion of the rotor yoke 5A, and the rotor yoke 5A, the self starting can be performed even in the single-phase bipolar constitution similarly as the conventional induction motor. Additionally, during running, the synchronous running can be secured by the action of the embedded permanent magnet 31, the braking torque generated during the transient state from the starting until the synchronous running raises no problem, and the secondary copper loss during running can largely be reduced.

Moreover, because the winding ratio of the main winding 7A to the auxiliary winding 7B by the effecting winding number calculation, a stator winding structure can remain to be the single-phase bipolar structure similarly as the conventional induction motor. This obviates the necessity of additional equipment such as changing of the equipment associated with manufacturing of the stator. Additionally, a running capacitor capacity can be matched to largely improve the running efficiency.

Furthermore, because the squirrel-cage secondary conductor 5B is provided with the skewed structure, similarly as the conventional induction motor, it is possible to easily perform self starting with the single phase power source. This allows the motor 2 to easily perform the self starting even with the single phase power source. Moreover, because the permanent magnet 31 is formed of a rare earth magnet, it is possible to remarkably increase the magnetic flux density of the permanent magnet 31.

Moreover, because two, four, six, or eight permanent magnets 31 are embedded in the rotor yoke 5A, it is possible to set the number of permanent magnets 21 in accordance with a purpose of the motor 2 for use. Furthermore, because the power supply circuit of the stator winding 7 is provided with the current sensitive protection means 34 for detecting the line current, during heating of the rotor 5, the power supply to the motor 2 can be cut off to suppress the temperature rise of the rotor 5. This can prevent the permanent magnet 31 embedded in the rotor 5 from causing the temperature demagnetization by the heat.

Figure 5:
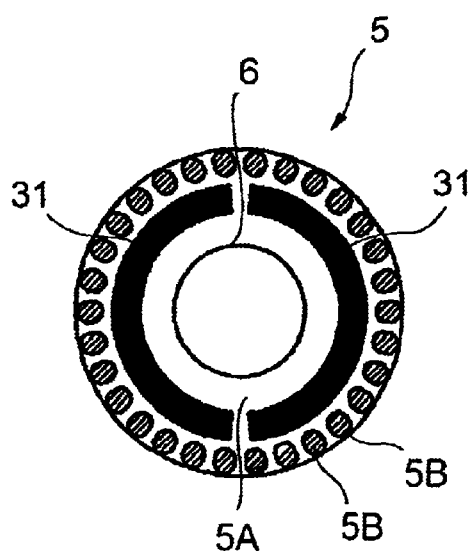
FIG. 5 is another transverse top plan view of the rotor of the present invention.

Next, FIG. 5 shows another rotor 5 in which two permanent magnets 31 are embedded into the rotor yoke 5A. In this case, the permanent magnets 31 are embedded inside the squirrel-cage secondary conductors 5B in circular arc shapes with a predetermined interval close to each other, and each permanent magnet 31 is embedded to extend from one end to the other end of the rotor yoke 5A. Both permanent magnets 31 are embedded toward the outside of the circumferential direction of the rotor 5 with different magnetic poles.

Figure 6:
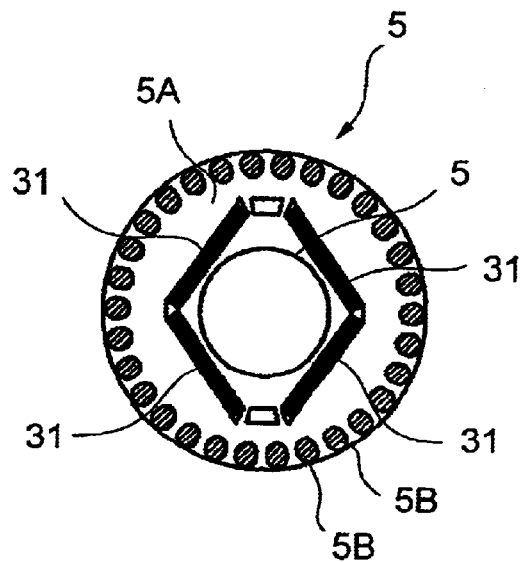
FIG. 6 is still another transverse top plan view of the rotor of the present invention.
Figure 7:
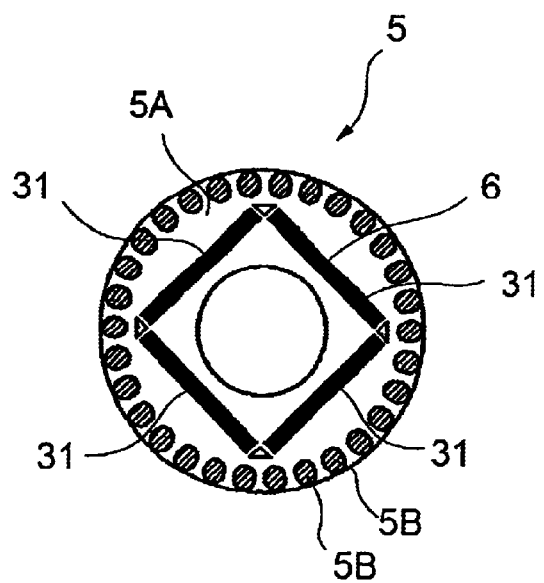
FIG. 7 is still another transverse top plan view of the rotor of the present invention.
Figure 8:
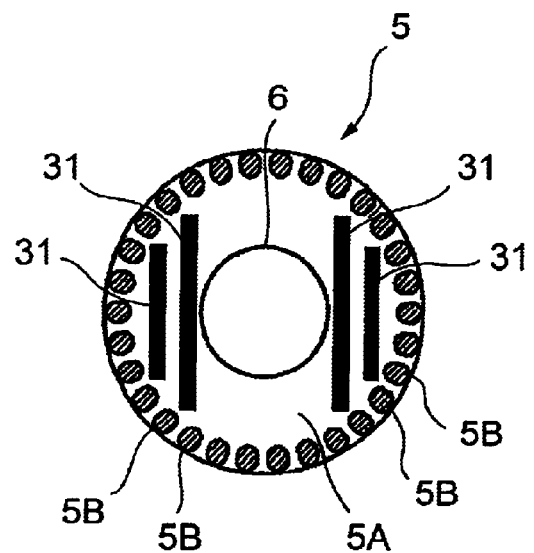
FIG. 8 is still another transverse top plan view of the rotor of the present invention.

Moreover, FIGS. 6, 7, and 8 shows another rotor 5 in which four permanent magnets 31 are embedded in the rotor yoke 5A. In FIG. 6, the permanent magnets 31 are embedded inside the squirrel-cage secondary conductors 5B, two of the permanent magnets 31 are arranged substantially in a V shape and opposite to the other pair of the magnets centering on the rotor 5, and the magnets are arranged substantially in a vertically long rhombus shape. Additionally, each permanent magnet 31 is embedded to extend from one end to the other end of the rotor yoke 5A. Moreover, in FIG. 7, the permanent magnets 31 are embedded inside the squirrel-cage secondary conductors 5B, and two of the permanent magnets 31 are arranged substantially in a square shape and opposite to the other pair of the magnets centering on the rotor 5 to obtain a substantially square arrangement. Additionally, each permanent magnet 31 is embedded to extend from one end to the other end of the rotor yoke 5A.

Moreover, in FIG. 8, two permanent magnets 31 formed in plate shapes are embedded in the vicinity of the rotation shaft 6, and parallel to these magnets 31, the other magnets are embedded with a predetermined interval on the side of the squirrel-cage secondary conductors 5B. One pair of permanent magnets 31 are embedded opposite to the other pair centering on the rotation shaft 6, and four permanent magnets 31 in total are embedded to extend from one end to the other end of the rotor yoke 5A. Moreover, the respective permanent magnets 31 embedded opposite to each other centering on the rotor 5 are embedded with different magnetic poles toward the outside of the circumferential direction of the rotor 5 centering on the rotation shaft 6. That is, when four permanent magnets 31 are embedded opposite to each other centering on the rotation shaft 6, a magnetic force of the permanent magnet 31 is increased. This can realize a further large running efficiency and power factor.

Figure 9:
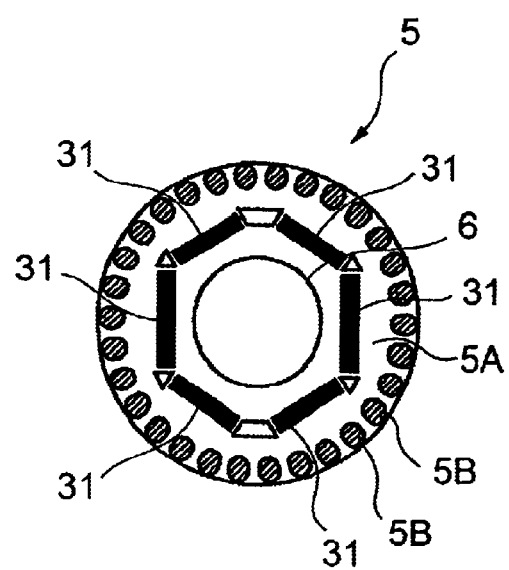
FIG. 9 is still another transverse top plan view of the rotor of the present invention.
Figure 10:
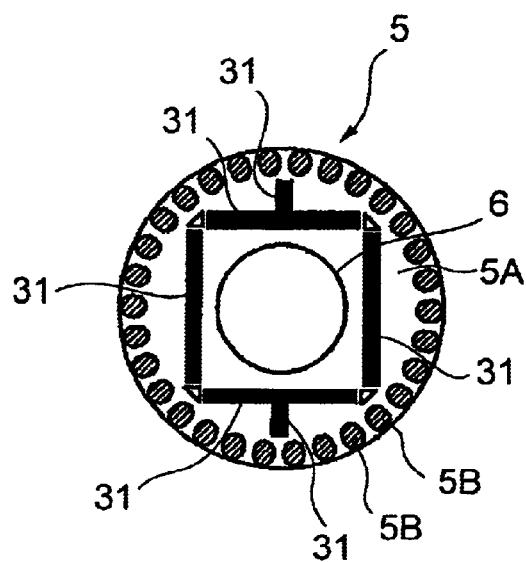
FIG. 10 is still another transverse top plan view of the rotor of the present invention.

Furthermore, FIGS. 9 and 10 show another rotor 5 in which six permanent magnets 31 are embedded in the rotor yoke 5A. In FIG. 9, the permanent magnets 31 are arranged in a hexagonal shape inside the squirrel-cage secondary conductors 5B. Moreover, in FIG. 10, four permanent magnets 31 are embedded in the state of FIG. 7, and the permanent magnets 31 are embedded in centers of and substantially at right angles to the opposite permanent magnets 31. The permanent magnets 31 embedded substantially at right angles are embedded on departing sides of the opposite permanent magnets 31, and the respective permanent magnets 31 are embedded to extend from one end to the other end of the rotor yoke 5A. Moreover, the respective permanent magnets 31 embedded opposite to each other centering on the rotor 5 are embedded with different magnetic poles toward the outside of the circumferential direction of the rotor 5 centering on the rotation shaft 6. That is, six permanent magnets 31 are embedded opposite to each other centering on the rotation shaft 6 to increase the magnetic force of the permanent magnet 31.

Figure 11:
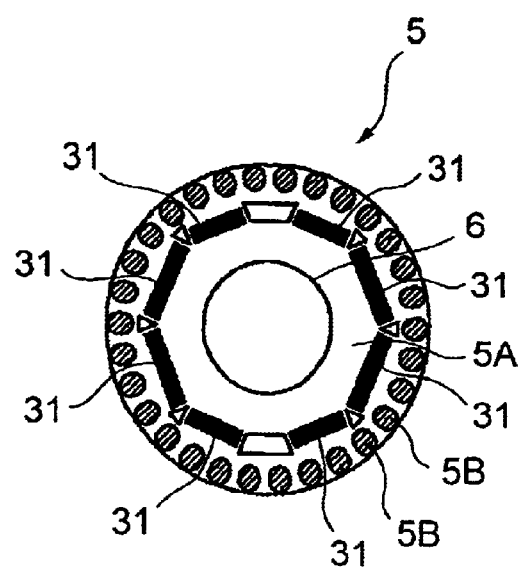
FIG. 11 is still another transverse top plan view of the rotor of the present invention.
Figure 12:
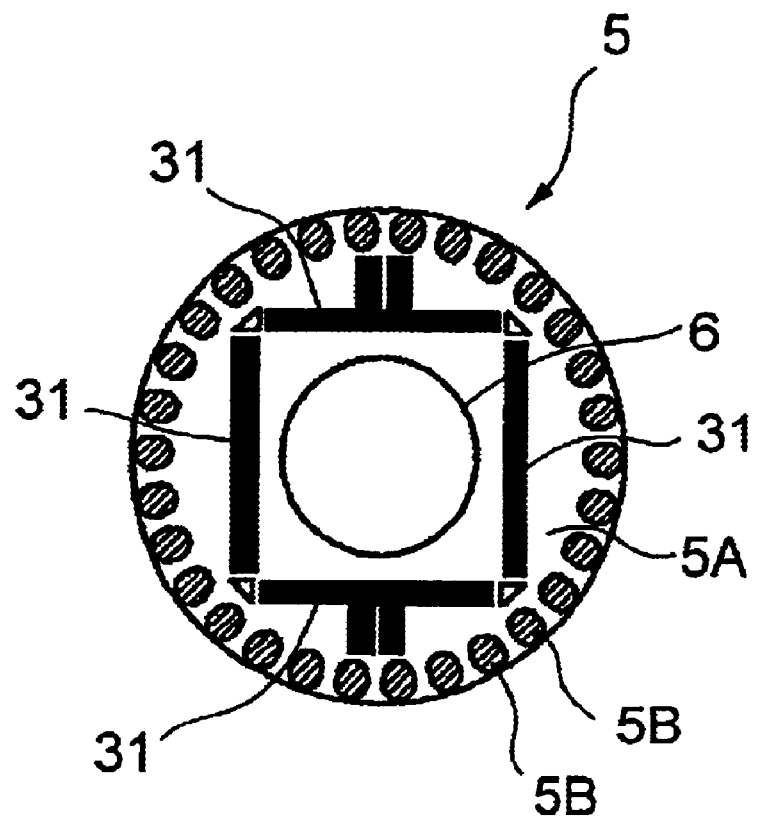
FIG. 12 is still another transverse top plan view of the rotor of the present invention.

Additionally, FIGS. 11 and 12 show another rotor 5 in which eight permanent magnets 1 are embedded in the rotor yoke 5A. In FIG. 11, the permanent magnets 31 are arranged in an octagonal shape inside the squirrel-cage secondary conductors 5B, and the respective permanent magnets 31 are embedded to extend from one end to the other end of the rotor yoke 5A. Moreover, in FIG. 12, eight permanent magnets 31 are embedded in the state of FIG. 7, and two permanent magnets 31 are embedded parallel to each other in the center of and substantially at right angles to the opposite permanent magnet 31. Two permanent magnets 31 embedded substantially at right angles are embedded on the departing sides of the opposite permanent magnets 31, and the respective permanent magnets 31 are embedded to extend from one end to the other end of the rotor yoke 5A. Moreover, the respective permanent magnets 31 embedded opposite to each other centering on the rotor 5 are embedded with different magnetic poles toward the outside of the circumferential direction of the rotor 5 centering on the rotation shaft 6. That is, eight permanent magnets 31 are embedded opposite to each other centering on the rotation shaft 6 to further increase the magnetic force of the permanent magnet 31. In this manner, when a plurality of magnets are disposed, much more running efficiency and power factor can be realized.

As described above in detail, according to the present invention, the electromotive element is fixed to the sealed container, and is constituted of the stator provided with the stator winding and the rotor rotating in the stator, and the rotor is constituted of the squirrel-cage secondary conductor disposed in the peripheral portion of the rotor yoke, and the permanent magnet embedded in the rotor yoke. Therefore, the electromotive element can be allowed to self-start even with the single-phase bipolar constitution similarly as the conventional induction motor. Moreover, during running, the synchronous running can be secured by the action of the embedded permanent magnet. This can largely decrease the secondary copper loss during running. Therefore, the running efficiency and power factor of the electromotive element can largely be enhanced.

Moreover, according to the present invention, in addition to this, the electromotive element is started by the system in which the startup capacitor is used. Therefore, during the transient state of the electromotive element from the starting until the synchronous running, a large braking torque is generated by the permanent magnet, but during self starting, a surpassing large torque can be generated. Therefore, even when load is large during starting, the electromotive element can remarkably easily be started.

Furthermore, according to the present invention, in addition to the above, the stator winding comprises the main and auxiliary windings, and the winding ratio of the respective windings by the effective winding number calculation is set to $1.0\pm0.5$. Therefore, the stator winding structure can remain to be a single-phase bipolar structure similarly as the conventional induction motor. This obviates the necessity of additional equipment such as the equipment change associated with manufacturing of the stator. Particularly, when the effective winding number ratio of the main winding to the auxiliary winding of the stator is set to $1.0\pm0.5$, and the running capacitor capacity is matched, the running efficiency can largely be improved.

Additionally, according to the present invention, in addition to the above, since the rotor squirrel-cage secondary conductor is provided with the skewed structure, for example, similarly as the conventional induction motor, the self starting can easily be performed even with the single phase power source. Therefore, the electromotive element can easily self-start even with the single phase power source and is remarkably practically effective.

Moreover, according to the present invention, in addition to the above, since the permanent magnet is a rare earth magnet, the magnetic flux density of the permanent magnet embedded in the rotor yoke can largely be increased. This can achieve a remarkably high running efficiency during synchronous running. Therefore, power consumption can largely be reduced.

Furthermore, according to the present invention, in addition to the above, since the number of permanent magnets embedded in the rotor yoke is any number of two, four, six and eight, it is possible to set the number of permanent magnets in accordance with the purpose. Therefore, general-purpose properties can largely be enlarged.

Additionally, according to the present invention, in addition to the above, since the current sensitive protection means for detecting the line current is disposed, it is possible to cut off the power supply to the electromotive element during heating of the rotor and suppress the temperature rise of the rotor. This can prevent the temperature demagnetization by the heat of the permanent magnet embedded in the rotor beforehand. Therefore, even when a large load or a large current flows through the rotor conductor to generate heat during running of the electromotive element, the temperature demagnetization of the permanent magnet can securely be prevented, and the reliability of the electromotive element can largely be enhanced.

Figure 13:
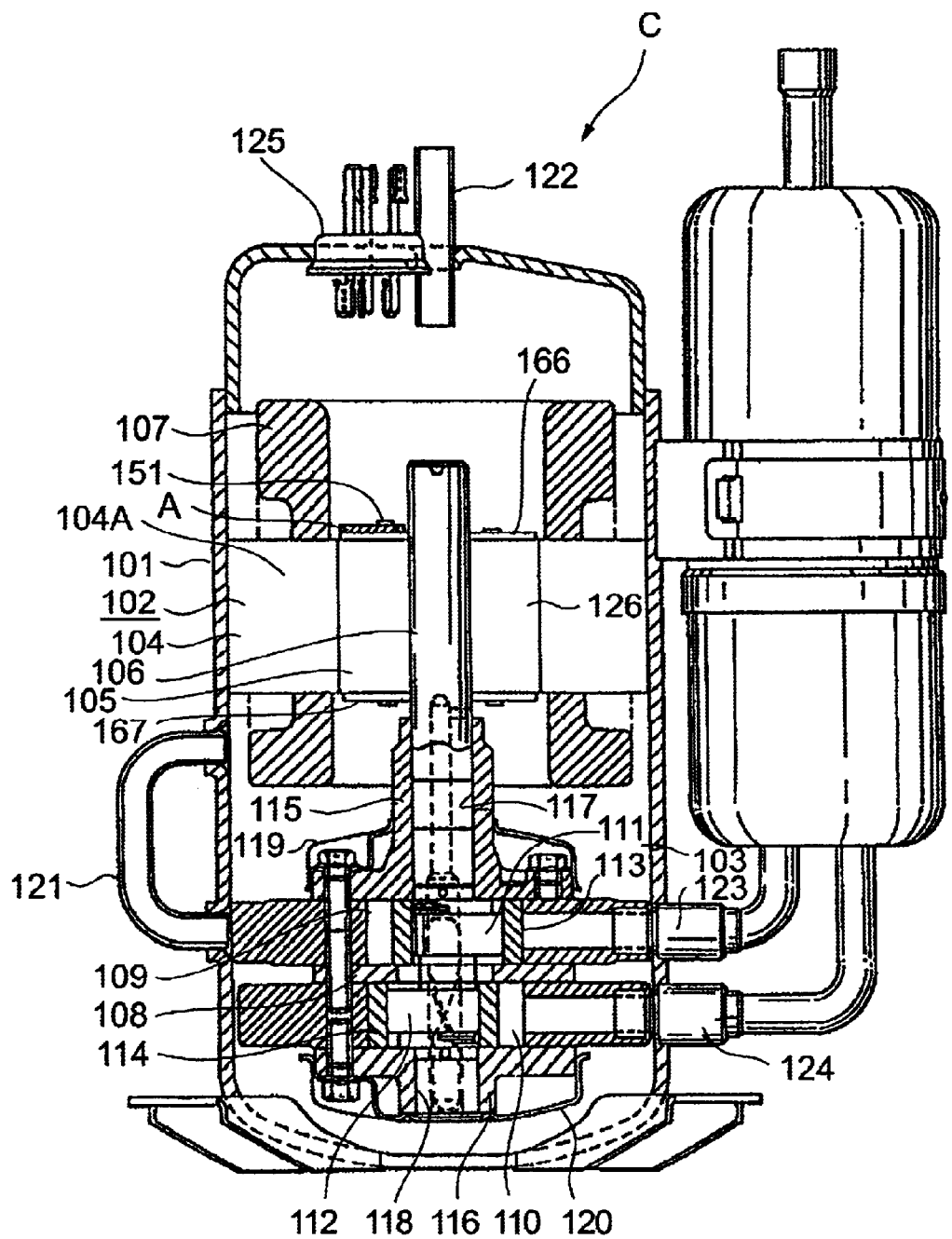
FIG. 13 is a vertical side sectional view of the sealed motor compressor to which another present invention is applied.

Another embodiment of the present invention will next be described with reference to FIGS. 13 to 24. FIG. 13 is a vertical side sectional view of the sealed motor compressor C to which the present invention is applied. In FIG. 13, in a sealed container 101, a motor (alternating current induction motor) 102 is contained as the electromotive element in the upper part of the container, and a compressing element 103 rotated/driven by the motor 102 is contained in the lower part of the container. The sealed container 101 is constituted by containing the motor 102 and compressing element 103 beforehand in two pre-divided sections, and hermetically closing the sections by high-frequency welding. Additionally, examples of the sealed motor compressor C include a rotary compressor, reciprocating compressor, and scroll compressor.

The motor 102 is provided with a three-phase bipolar constitution, and constituted of a stator 104 fixed to the inner wall of the sealed container 101, and a rotor 105 supported inside the stator 104 to be freely rotatable centering on a rotation shaft 106. Moreover, a stator iron core 104A of the stator 104 is provided with a stator winding 107 for supplying a rotary magnetic field to the rotor 105.

The compressing element 103 is provided with a first rotary cylinder 109 and second rotary cylinder 110 which are divided from each other by a middle partition plate 108. Eccentric parts 111, 112 rotated/driven by the rotation shaft 106 are attached to the respective cylinders 109, 110, and these eccentric parts 111, 112 deviate from each other in phase by 180 degrees.

Numerals 113, 114 denote first and second rollers rotating in the respective cylinders 109, 110, and the respective rollers rotate in the cylinders by rotation of the eccentric parts 111, 112. Numerals 115, 116 denote first and second frames, the first frame 115 forms a closed compression space of the cylinder 109 together with the middle partition plate 108, and the second frame 116 similarly forms the closed compression space of the cylinder 110 together with the middle partition plate 108. Moreover, the first and second frames 115, 116 are provided with bearings 117, 118 which rotatable support the lower part of the rotation shaft 106.

Discharge mufflers 119, 120 are attached to cover the first and second frame 115, 116, respectively. Additionally, the cylinder 109 and discharge muffler 119 are connected to each other via the discharge hole (not shown) disposed in the first frame 115, and the cylinder 110 and discharge muffler 120 are also connected to each other via the discharge hole (not shown) disposed in the second frame 116. A bypass tube 121 is disposed on the outer part of the sealed container 101, and connected to the inside of the discharge muffler 120.

Moreover, numeral 122 denotes a discharge tube disposed on the top of the sealed container 101, and 123, 124 denote suction tubes connected to the cylinders 109, 110. Moreover, numeral 125 denotes a sealed terminal for supplying power to the stator winding 107 of the stator 104 from the outside of the sealed container 101 (the lead wire for connecting the sealed terminal 125 to the stator winding 107 is not shown).

Moreover, numeral 126 denotes a rotor core in which a plurality of rotor iron plates obtained by stamping 0.3 to 0.7 mm thick electromagnetic steel plates into predetermined shapes (not shown) are laminated and integrally caulked/laminated onto one another (additionally, the plates may integrally be welded to one another without being caulked). Numerals 166, 167 denote flat-plate end surface members attached to upper and lower ends of the rotor iron core 126, and the members are molded of nonmagnetic materials such as aluminum and resin materials into substantially the same shapes as those of the rotor iron plates. A balance weight A is fixed to the rotor iron core 126 via the upper end surface member 166 by a rivet 151.

Figure 14:
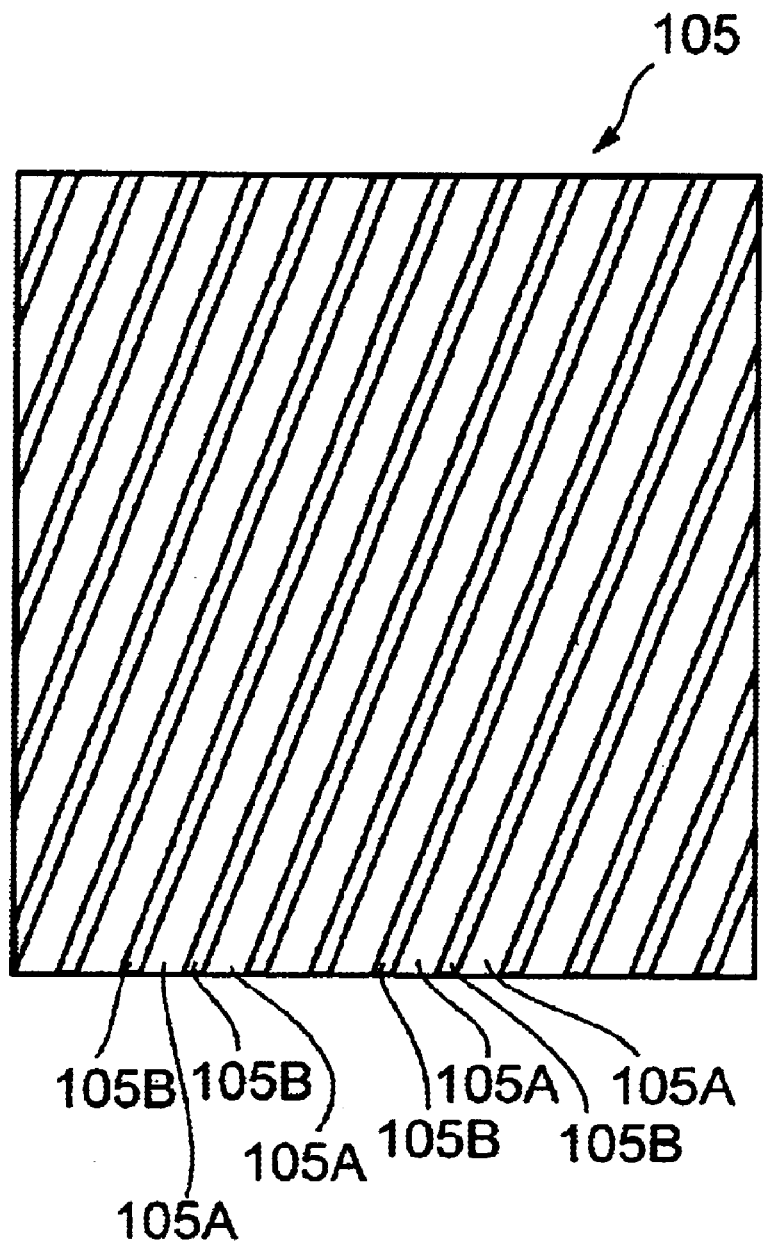
FIG. 14 is a plan view of the rotor of the sealed motor compressor of FIG. 13.
Figure 15:
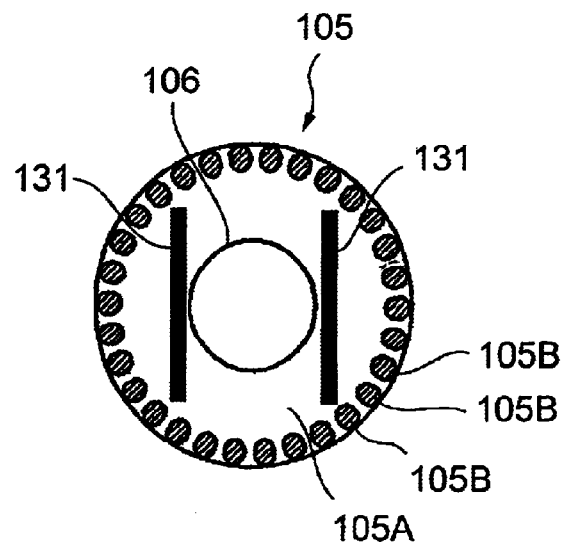
FIG. 15 is a transverse top plan view of the rotor of FIG. 14.

FIG. 14 is a plan view of the rotor 105 shown in FIG. 13, and FIG. 15 is a transverse top plan view of the rotor 105. The rotor 105 is constituted of a rotor yoke 105A, squirrel-cage secondary conductor 105B disposed in the peripheral portion of the rotor yoke 105A, and a permanent magnet 131 embedded in the rotor yoke 105A. A plurality of squirrel-cage secondary conductors 105B are disposed in the peripheral portion of the rotor yoke 105A, and the conductor is injection-molded in a cylindrical hole (not shown) formed in the squirrel-cage shape across the extending direction of the rotation shaft 106 by aluminum die casting. Both ends of the squirrel-cage secondary conductor 105B are formed in a so-called skewed structure such that each end is sloped in a spiral form with a predetermined angle in a circumferential direction of the rotation shaft 106. The squirrel-cage secondary conductor 105B is constituted in a skew which is more than 0 and is 1.5 slot pitches or less. The 0 slot pitch means a state in which one-end slot of the squirrel-cage secondary conductor is vertically extended to the other end along the extending direction of the rotation shaft, and 1.5 slot pitches mean a state in which one-end slot is twisted by 1.5 slots toward the other end in a circumferential direction. That is to say, the skew is constituted between 0 and 1.5 slot pitches.

Moreover, two permanent magnets 131 are embedded in the rotor yoke 105A. The permanent magnets 131 are formed in plate shapes, disposed opposite and parallel to each other centering on the rotor 105, and embedded from one end to the other end of the rotor yoke 105A. Used in the permanent magnet 131 is a rare earth magnet which has a highest magnetic flux density among permanent magnets. Opposite surfaces of the permanent magnets 131 are embedded with different magnetic poles. That is to say, the respective permanent magnets 131 are embedded toward the outside of the circumferential direction of the rotor 105 with different magnetic poles, and constituted such that the rotating force can be imparted to the rotor 105 with the magnetic force lines of respective windings 107A, 107B, and 107C described later.

Figure 16:
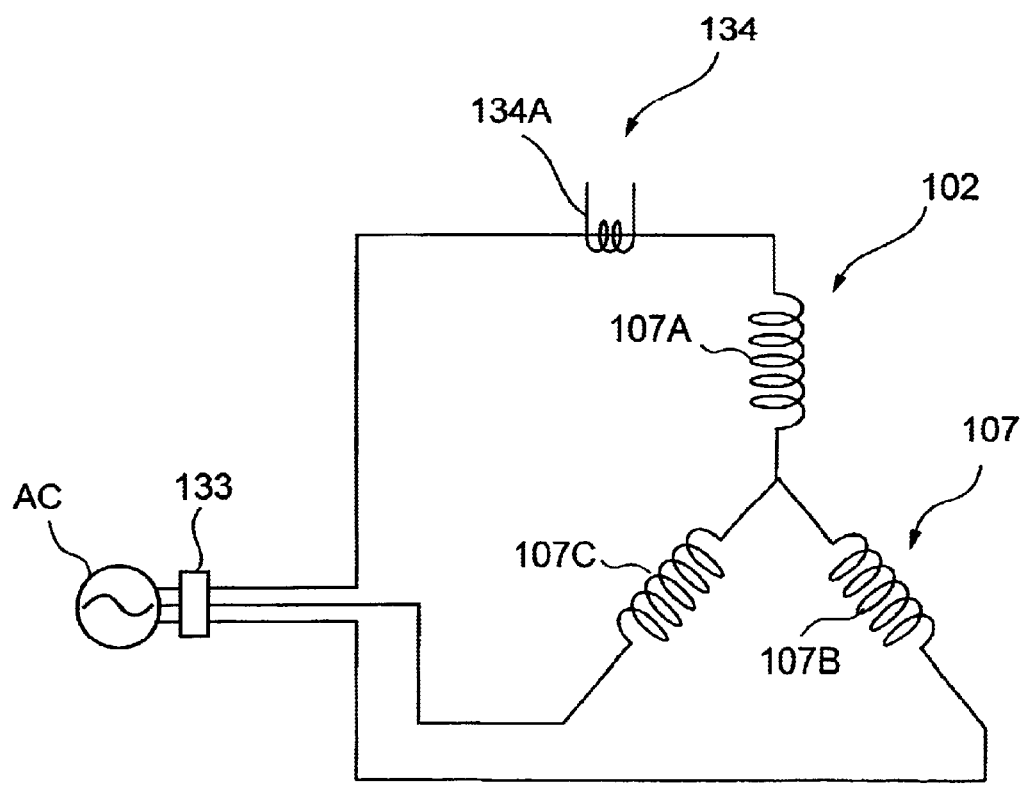
FIG. 16 is an electric circuit diagram of the electromotive element (motor) constituting the sealed motor compressor of FIG. 13.

On the other hand, in FIG. 16, the motor (electromotive element) 102 is provided with the three-phase stator winding 107 comprising the windings 107A, 107B, and 107C. The stator winding 107 is constituted of the windings 107A, 107B, and 107C, and the windings 107A, 107B, and 107C are connected to a three-phase alternating commercial power supply AC via a power switch 133.

The power supply circuit of the stator winding 107 is provided with current-sensitive protection means 134 for detecting the line current, the protection means 134 is constituted of a line current detector 134A for detecting the line current, and a protection switch. In this case, the power switch 133 also serves as the protection switch That is to say, the motor 102 is protected in a current-sensitive CT control system. Moreover, when the line current detector 134A senses a predetermined current, the line current detector 134A actuates the protection switch (power switch 133) in such a manner that power supply to the stator winding 107 can be cut off. Additionally, a protection switch (not shown) other than the power switch 133 may be disposed in series with the power switch 133.

Operation of the aforementioned constitution will next be described. When the power switch 133 is closed, three-phase current starts to flow to the windings 107A, 107B, and 107C, and the rotor 105 starts in the predetermined rotation direction. In this case, since the rotor 105 has a squirrel-cage secondary conductor 105B similar to a general induction machine, the rotor 105 responds to the current flowing to the stator winding 107 and the motor 102 is started.

In this case, since a three-phase sine wave alternating current (three-phase alternating commercial power supply AC) is applied to the stator winding 107, the rotor 105 of the motor 102 can perform self-starting similarly as the conventional induction synchronous electromotive element, and can perform synchronous running by the action of the embedded permanent magnet 131 during running.

Moreover, two permanent magnets 131 are embedded in the rotor yoke 105A, and the squirrel-cage secondary conductor 105B of the rotor 105 is provided with the structure of the skew more than 0 and 1.5 slot pitches or less. Thereby, during the transient state of the motor 102 from the startup moment at which the power switch 133 closes until the motor enters the synchronous running, it is possible to generate a torque larger than a braking torque generated by the permanent magnet 131. Therefore, similarly as the conventional induction electromotive element, the synchronous running can easily be performed with the three-phase alternating commercial power supply AC, and the secondary copper loss during running can largely be decreased.

On the other hand, during running of the motor 102, the line current detector 134A monitors the current flowing through the stator winding 107, and it is possible to cut off the power supply to the motor 102 when the rotor 105 generates heat. That is, when the rotor 105 generates heat, the protection means 134 cuts off the current flowing through the stator winding 107, and prevents the rotor 105 from further raising its temperature. This can prevent the permanent magnet 131 embedded in the rotor 105 from being demagnetized by heat (demagnetization by temperature). Additionally, since demagnetization by the predetermined temperature added to the permanent magnet 131 is a conventional known technique, detailed description thereof is omitted.

As described above, in the rotor 105 of the motor 102 provided with the three-phase bipolar constitution, the permanent magnets 131 are embedded in the squirrel-cage secondary conductor 105B disposed in the peripheral portion of the rotor yoke 105A, and the rotor yoke 105A. Moreover, the squirrel-cage secondary conductor 105B of the rotor 105A is structured such that the skew is more than 0 and is 1.5 slot pitches or less. Therefore, the self starting can be performed even in the three-phase bipolar constitution similarly as the conventional induction motor. Additionally, during running, the synchronous running can be secured by the action of the embedded permanent magnet 131. Therefore, the braking torque generated during the transient state from the starting until the synchronous running raises no problem, and the secondary copper loss during running can largely be reduced.

Moreover, in the embodiment, the winding (windings 107A, 107B, 107C) of the stator 104 is constituted similarly as the conventional induction motor, and the motor 102 is provided with the three-phase bipolar structure. This obviates the necessity of additional equipment such as changing of the equipment associated with manufacturing of the stator 104. Additionally, the running efficiency can largely be improved.

On the other hand, a compression volume, and the like of the sealed motor compressor C is adjusted in accordance with a necessary capability. Even when a running load changes, running is possible in a high efficiency/power factor. This can largely improve the power factor and efficiency entirely during light load and overload. Moreover, a change of power factor/efficiency by a load fluctuation can largely be reduced.

Next, Table 1 shows an example of comparison of the conventional induction motor with the motor 102 of the present invention (referred to as the induction synchronous motor in the table) in the power factor and efficiency during usual running and during power control running. Additionally, it is assumed that the load during usual running is 3.0 N.m, and the load during the power control running is 1.5 N.m.

TABLE 1

|  | Usual running<br>*running load:3.0 N·m | Power control running<br>*running load:1.5 N·m |
| --- | --- | --- |
| Induction motor |  |  |
| Power factor (%) | 84.5 | 72.2 |
| Efficiency (%) | 87.0 | 88.3 |
| Induction synchronous motor |  |  |
| Power factor (%) | 95.0 (+9.6%) | 92.9 (+20.7%) |
| Efficiency (%) | 91.1 | 91.7 |

As described above, the synchronous running is secured during running of the motor 102, and the secondary copper loss largely decreases, so that the efficiency and power factor can largely be improved.

Moreover, in the conventional induction motor, the power factor of the light-load running is extremely lowered. In the motor 102 of the present invention, however, since the permanent magnet 131 is formed of a rare earth magnet, a high power factor running is possible from the light load to the overload. This can largely reduce the change amount of the power factor/efficiency by the load fluctuation, and the power factor/efficiency can largely be improved.

Figure 17:
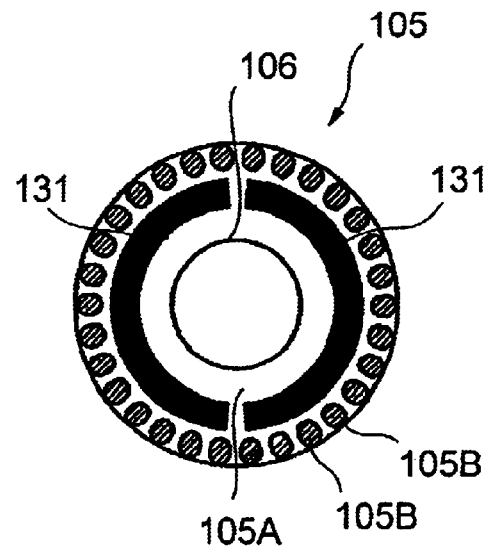
FIG. 17 is another transverse top plan view of the rotor of the present invention.

Next, FIG. 17 shows another rotor 105 in which two permanent magnets 131 are embedded into the rotor yoke 105A. In this case, the permanent magnets 131 are embedded inside the squirrel-cage secondary conductors 105B in circular arc shapes with a predetermined interval close to each other, and each permanent magnet 131 is embedded to extend from one end to the other end of the rotor yoke 105A. Both permanent magnets 131 are embedded toward the outside of the circumferential direction of the rotor 105 with different magnetic poles.

Figure 18:
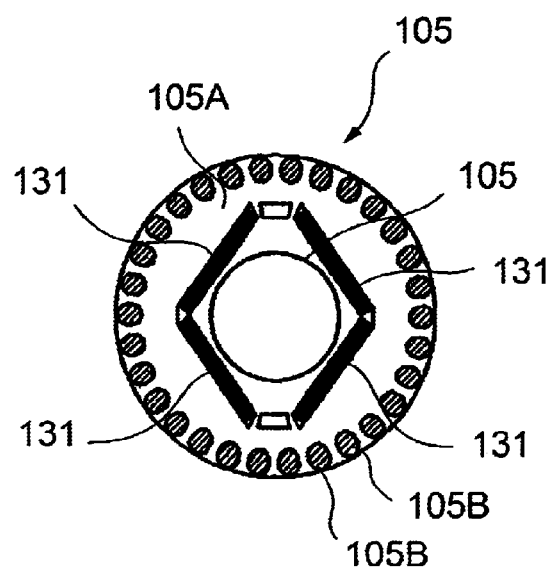
FIG. 18 is still another transverse top plan view of the rotor of the present invention.
Figure 19:
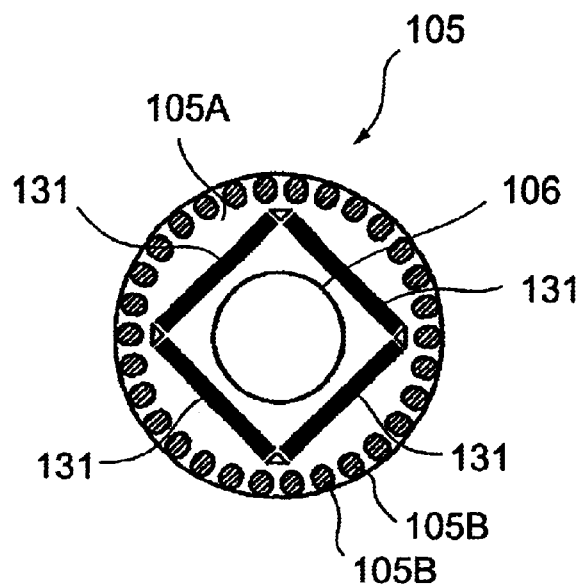
FIG. 19 is still another transverse top plan view of the rotor of the present invention.
Figure 20:
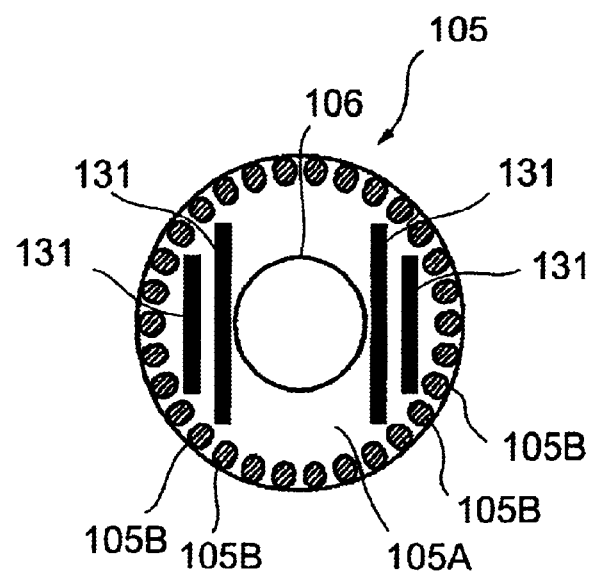
FIG. 20 is still another transverse top plan view of the rotor of the present invention.

Moreover, FIGS. 18, 19, and 20 show another rotor 105 in which four permanent magnets 131 are embedded in the rotor yoke 105A. In FIG. 18, the permanent magnets 131 are embedded inside the squirrel-cage secondary conductors 105B, two of the permanent magnets 131 are arranged substantially in a V shape and opposite to the other pair of the magnets centering on the rotor 105, and the magnets are arranged substantially in a vertically long rhombus shape. Additionally, each permanent magnet 131 is embedded to extend from one end to the other end of the rotor yoke 105A. Moreover, in FIG. 19, the permanent magnets 131 are embedded inside the squirrel-cage secondary conductors 105B, and two of the permanent magnets 131 are arranged substantially in a square shape and opposite to the other pair of the magnets centering on the rotor 105 to obtain a substantially square arrangement. Additionally, each permanent magnet 131 is embedded to extend from one end to the other end of the rotor yoke 105A.

Moreover, in FIG. 20, two permanent magnets 131 formed in plate shapes are embedded in the vicinity of the rotation shaft 106, and parallel to these magnets 131, the other magnets are embedded with a predetermined interval on the side of the squirrel-cage secondary conductors 105B. One pair of permanent magnets 131 are embedded opposite to the other pair centering on the rotation shaft 106, and four permanent magnets 131 in total are embedded to extend from one end to the other end of the rotor yoke 105A. Moreover, the respective permanent magnets 131 embedded opposite to each other centering on the rotor 105 are embedded with different magnetic poles toward the outside of the circumferential direction of the rotor 105 centering on the rotation shaft 106. That is, when four permanent magnets 131 are embedded opposite to each other centering on the rotation shaft 106, the magnetic force of the permanent magnet 131 is increased. This can realize a further large running efficiency and power factor.

Figure 21:
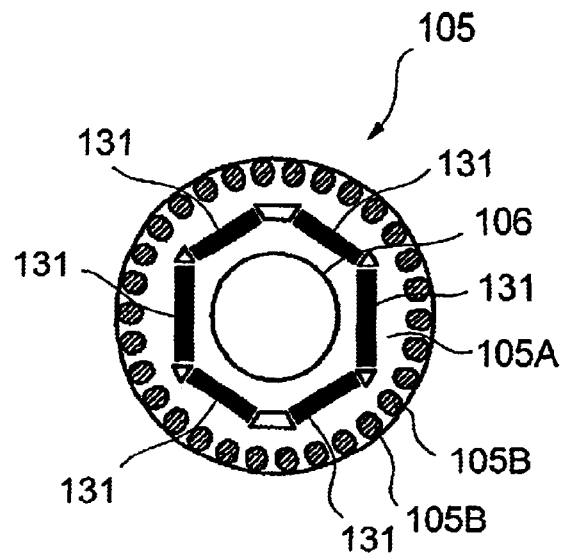
FIG. 21 is still another transverse top plan view of the rotor of the present invention.
Figure 22:
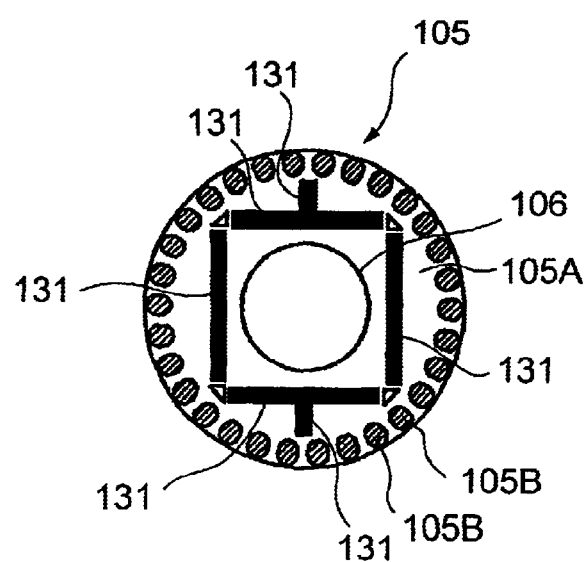
FIG. 22 is still another transverse top plan view of the rotor of the present invention.

Furthermore, FIGS. 21 and 22 show another rotor 105 in which six permanent magnets 131 are embedded in the rotor yoke 105A. In FIG. 21, the permanent magnets 131 are arranged in a hexagonal shape inside the squirrel-cage secondary conductors 105B, and each permanent magnet 131 is embedded to extend from one end to the other end of the rotor yoke 105A. Moreover, in FIG. 22, four permanent magnets 131 are embedded in the state of FIG. 19, and the permanent magnets 131 are embedded in centers of and substantially at right angles to the opposite permanent magnets 131. The permanent magnets 131 embedded substantially at right angles are embedded on departing sides of the opposite permanent magnets 131, and the respective permanent magnets 131 are embedded to extend from one end to the other end of the rotor yoke 105A. Moreover, the respective permanent magnets 131 embedded opposite to each other centering on the rotor 105 are embedded with different magnetic poles toward the outside of the circumferential direction of the rotor 105 centering on the rotation shaft 106. That is, six permanent magnets 131 are embedded opposite to each other centering on the rotation shaft 106 to increase the magnetic force of the permanent magnet 131.

Figure 23:
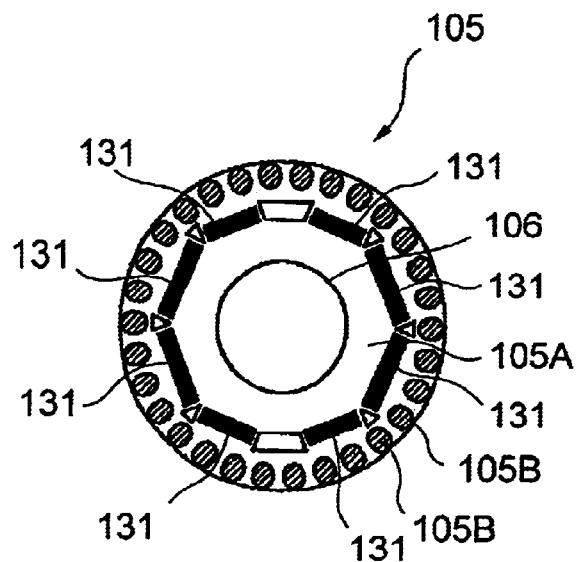
FIG. 23 is still another transverse top plan view of the rotor of the present invention.
Figure 24:
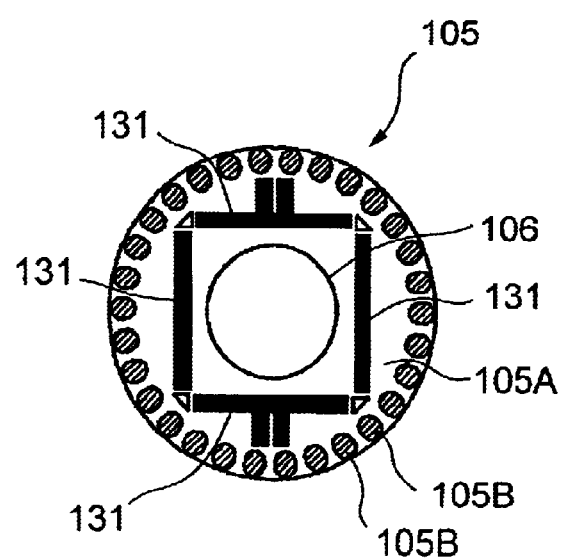
FIG. 24 is still another transverse top plan view of the rotor of the present invention.

Additionally, FIGS. 23 and 24 show another rotor 105 in which eight permanent magnets 131 are embedded in the rotor yoke 105A. In FIG. 23, the permanent magnets 131 are arranged in an octagonal shape inside the squirrel-cage secondary conductors 105B, and the respective permanent magnets 131 are embedded to extend from one end to the other end of the rotor yoke 105A. Moreover, in FIG. 24, eight permanent magnets 131 are embedded in the state of FIG. 19, and two permanent magnets 131 are embedded parallel to each other in the center of and substantially at right angles to the opposite permanent magnet 131. Two permanent magnets 131 embedded substantially at right angles are embedded on the departing sides of the opposite permanent magnets 131, and the respective permanent magnets 131 are embedded to extend from one end of the rotor yoke 105A. Moreover, the respective permanent magnets 131 embedded opposite to each other centering on the rotor 105 are embedded with different magnetic poles toward the outside of the circumferential direction of the rotor 105 centering on the rotation shaft 106. That is, eight permanent magnets 131 are embedded opposite to each other centering on the rotation shaft 106 to further increase the magnetic force of the permanent magnet 131. In this manner, when a plurality of magnets are disposed, much more running efficiency and power factor can be realized.

As described above, when two, four, six or eight permanent magnets 131 are embedded in the rotor yoke 105A, the number of the permanent magnets 131 can be set in accordance with the purpose of the motor 102. This secures the synchronous running during running of the motor 102 and reduces the secondary copper loss, and can thereby largely improve the efficiency and power factor.

Moreover, since the skew of the rotor 105 (squirrel-cage secondary conductor 105B) is set to more than 0, and 1.5 slot pitches or less, the skew of the squirrel-cage secondary conductor can be constituted to be optimum. That is, when the skew is 0, the secondary copper loss can most be decreased, so that an optimum efficiency can be obtained. On the other hand, when the skew is more than 0, and 1.5 slot pitches or less, cogging properties during one rotation is reduced, and starting torque can be enhanced. Therefore, similarly as the conventional induction electromotive element, the general characteristics can be optimized.

Particularly, the motor 102 can operate with from the light load to the overload at a high power factor and efficiency. Therefore, the change amount of the power factor/efficiency by the load fluctuation can largely be reduced, and the power factor/efficiency can largely be improved entirely from the light load to the overload.

As described above, according to the present invention, the electromotive element driven by the three-phase power source is fixed to the sealed container, and is constituted of the stator provided with the stator winding and the rotor rotating in the stator, and the rotor is constituted of the squirrel-cage secondary conductor disposed in the peripheral portion of the rotor yoke, and the permanent magnet embedded in the rotor yoke. Therefore, the electromotive element can be allowed to self-start similarly as the conventional induction motor. Moreover, during running, the synchronous running can be performed by the action of the embedded permanent magnet. Since the synchronous running is secured during running of the electromotive element, the secondary copper loss is decreased during running. Therefore, the efficiency and power factor of the electromotive element can largely be enhanced.

Moreover, since the stator winding is structured similarly as the conventional induction motor, and the three-phase bipolar structure is used, any specially additional equipment is unnecessary. Therefore, the equipment change associated with the stator structure is unnecessary, and the manufacturing cost increase of the electromotive element can be prevented.

Furthermore, since the rotor squirrel-cage secondary conductor is provided with the skewed structure, and the skew pitch is set to more than 0, and 1.5 slot pitches or less, the optimum skew of the squirrel-cage secondary conductor can be constituted. That is, when the skew is 0, the secondary copper loss can most be decreased, and the optimum efficiency can be obtained. On the other hand, when the skew is more than 0, and 1.5 slot pitches or less, the cogging properties during one rotation can be lowered, and the starting torque can be enhanced. Therefore, similarly as the conventional induction motor, the entire characteristics can be optimized.

Moreover, since the permanent magnet is a rare earth magnet, a high efficiency can be obtained during synchronous running. This can largely improve the power factor/efficiency. Therefore, the power consumption of the sealed motor compressor can largely be reduced.

Furthermore, since the number of permanent magnets embedded in the rotor yoke is any even number, it is possible to set the number of permanent magnets in accordance with the purpose. Therefore, general-purpose properties can largely be enlarged.

Additionally, since the current sensitive protection means for detecting the line current is disposed, it is possible to cut off the power supply to the electromotive element during much heating of the rotor and to suppress the temperature rise of the rotor. This can securely prevent the temperature demagnetization by the heat of the rare earth magnet embedded in the rotor. Therefore, even when a large current flows through the rotor conductor to generate heat during running of the electromotive element, the temperature demagnetization of the permanent magnet can securely be prevented, and the reliability of the electromotive element can largely be enhanced.

Moreover, since capability control is possible, the compression volume, and the like of the compressor is adjusted in accordance with a necessary capability during controlled running. Even when the running load changes, the running can be performed at the high efficiency/power factor.

Especially, in the ordinary induction electromotive element, the power factor during light-load running with controlled capability is excessively lowered. In the electromotive element of the present invention, however, high power factor running is possible with from the light load to the overload. This can largely reduce the change amount of the power factor/efficiency by the load fluctuation. Therefore, the power factor/efficiency can largely be improved.

What is claimed is:

1. A sealed motor compressor comprising, in a sealed container, a compressing element and an electromotive element for driving the compressing element,
   wherein said electromotive element is fixed to said sealed container and comprises a stator provided with a stator winding and a rotor which rotates in the stator, and
   wherein said rotor comprises a squirrel-cage secondary conductor disposed in a peripheral portion of a rotor yoke and a plurality of rare earth permanent magnets embedded in the rotor yoke, and
   wherein the squirrel-cage secondary conductor of the rotor comprises a skewed structure.

2. The sealed motor compressor according to claim 1, wherein the electromotive element comprises a single-phase bipolar constitution.

3. The sealed motor compressor according to claim 2, wherein the electromotive element is started by a system in which a startup capacitor is used.

4. The sealed motor compressor according to claim 2, wherein the stator winding comprises a main winding and an auxiliary winding, and a winding ratio of the respective windings by effective winding number calculation is set to be in a range of 1.0±0.5.

5. The sealed motor compressor according to claim 1, wherein the squirrel-cage secondary conductor of the rotor comprises a skewed structure.

6. The sealed motor compressor according to claim 1, wherein the number of the rare earth permanent magnets embedded in the rotor yoke is any number selected from the group consisting of two, four, six and eight.

7. The sealed motor compressor according to claim 1, further comprising current-sensitive protection means for detecting a line current.

8. A sealed motor compressor comprising, in a sealed container, a compressing element and an electromotive element for driving the compressing element, said electromotive element being driven by a three-phase power source,
   wherein said electromotive element is fixed to said sealed container and comprises a stator provided with a stator winding and a rare earth permanent magnet embedded type rotor which rotates in the stator, and
   said rotor comprises a squirrel-cage secondary conductor disposed in a peripheral portion of a rotor yoke and a plurality of rare earth permanent magnets embedded in said rotor yoke, and
   wherein the squirrel-cage secondary conductor of the rotor comprises a skewed structure.

9. The sealed motor compressor according to claim 8, wherein the electromotive element comprises a three-phase bipolar constitution.

10. The sealed motor compressor according to claim 8, wherein a skew pitch is set to more than 0, and 1.5 slot pitches or less.

11. The sealed motor compressor according to claim 8, wherein the number of the rare earth permanent magnets embedded in the rotor yoke is any even number.

12. The sealed motor compressor according to claim 8, wherein the number of the permanent magnets embedded in the rotor yoke is any even number.

13. The sealed motor compressor according to claim 8, wherein capability control is possible.

* * * * *